US010289330B2

(12) United States Patent
Dreyer et al.

(10) Patent No.: US 10,289,330 B2
(45) Date of Patent: May 14, 2019

(54) ALLOCATING SHARED MEMORY AMONG MULTIPLE TASKS IN A MULTIPROCESSOR ENVIRONMENT

(71) Applicant: Western Digital Technologies, Inc., San Jose, CA (US)

(72) Inventors: David George Dreyer, Rochester, MN (US); Kevin James Wendzel, Rochester, MN (US); Alex Robert Gronseth, Rochester, MN (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 4 days.

(21) Appl. No.: 15/474,355

(22) Filed: Mar. 30, 2017

(65) Prior Publication Data
US 2018/0285010 A1  Oct. 4, 2018

(51) Int. Cl.
*G06F 3/06* (2006.01)

(52) U.S. Cl.
CPC .......... *G06F 3/0631* (2013.01); *G06F 3/0604* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 6,785,888 B1 | 8/2004 | McKenney et al. | |
| 7,219,210 B2 | 5/2007 | Russell et al. | |
| 7,571,440 B2 | 8/2009 | Vessey et al. | |
| 8,793,444 B2 | 7/2014 | Foster et al. | |
| 8,868,876 B2 | 10/2014 | Foster et al. | |
| 2005/0188175 A1* | 8/2005 | Chiang | ......... G06F 12/1036 711/206 |
| 2008/0183949 A1* | 7/2008 | Ly | ............... G06F 12/0246 711/103 |

(Continued)

OTHER PUBLICATIONS

J.M. Robson, Worst case fragmentation of first fit and best fit storage allocation strategies, The Computer Journal, vol. 20, Issue 3, Jan. 1, 1977, pp. 242-244 (Year: 1977).*

(Continued)

*Primary Examiner* — Mano Padmanabhan
*Assistant Examiner* — William E. Baughman
(74) *Attorney, Agent, or Firm* — Patterson & Sheridan, LLP; Steven Versteeg (57) ABSTRACT

The present disclosure generally relates to a method and system for efficiently sharing limited memory among multiple processors. Each processor has a local linked list. The local linked list identifies the pages allocated to the specific processor as well as the number of free codewords for each allocated page. Additionally, the local linked list includes the location of the next free codeword(s) for each allocated page. When all codewords are available, the page is considered free and may be sent back to the page pool used by all of the processors. If there are a sufficient number of contiguous free codewords on an allocated page, then new codeword data may be stored in the page. If there is not a sufficient number of contiguous free codewords on any allocated page, then a new page is allocated from the page pool. Thus, efficient allocate of memory resources is achieved.

12 Claims, 7 Drawing Sheets

(56) References Cited

U.S. PATENT DOCUMENTS

| | | | |
|---|---|---|---|
| 2012/0017042 A1* | 1/2012 | Matsui | G06F 3/0608 |
| | | | 711/114 |
| 2012/0131285 A1* | 5/2012 | Leshchiner | G06F 9/52 |
| | | | 711/147 |
| 2012/0221776 A1* | 8/2012 | Yoshihashi | G06F 12/0804 |
| | | | 711/103 |
| 2013/0036279 A1* | 2/2013 | Tatara | G06F 3/0604 |
| | | | 711/162 |
| 2015/0046661 A1 | 2/2015 | Gathala et al. | |
| 2015/0277772 A1 | 10/2015 | Tan et al. | |
| 2016/0259555 A1* | 9/2016 | Karamcheti | G06F 3/0604 |
| 2016/0314138 A1* | 10/2016 | Fang | G06F 17/30371 |
| 2017/0075814 A1* | 3/2017 | van Riel | G06F 12/023 |
| 2017/0371585 A1* | 12/2017 | Lazo | G06F 3/0656 |

OTHER PUBLICATIONS

Sundaram, et al.; Improving Dependability Using Shared Supplementary Memory and Opportunistic Micro Rejuvenation in Multi-Tasking Embedded Systems; dated 2007; 8 total pages.

* cited by examiner

ALLOCATING SHARED MEMORY AMONG MULTIPLE TASKS IN A MULTIPROCESSOR ENVIRONMENT

BACKGROUND OF THE DISCLOSURE

Field of the Disclosure

Embodiments of the present disclosure generally relate to a method and system for efficiently sharing limited memory among multiple processors.

Description of the Related Art

In a multiprocessor hard disk drive (HDD) or SSD environment with a shared memory, each processor needs to allocate memory for use with the restrictions that (1) memory that is already in use by another processor may not be allocated to an additional processor; and (2) too much memory may not be allocated to any individual processor. If too much memory is allocated to any one processor, the other processors may "starve" for lack of memory. Typically, memory is divided up into fixed sized chunks called pages. Each processor allocates pages as pages are needed. As a page that has been allocated to a processor is no longer needed, the page is returned to the global pool of pages so that the page may be (re)used by any of the processors in the system.

A page is the memory granularity required for write operations in a memory device such as an SSD device. A codeword is the memory granularity for read operations in a memory device such as an SSD device. A single read operation utilizes one or more codewords. In many memory devices, the page size is a multiple of the codeword size.

Depending upon the workload, each processor may only need a small fraction of a page for the task that the processor is handling. The simple solution is to ignore the large fraction of the page that is not needed and, when the processor is done with the memory that is needed, return the entire page back to the pool. For systems with a large amount of disposable memory, using only small portions of a page is not an issue. However, for smaller, embedded systems, such as systems running on HDDs or SSDs, there is typically not enough high-performance memory to allow for wasting large portions of allocated pages. Specifically, allocating memory is a low overhead operation (i.e., low processor cycles), and efficiency is currently lacking. Additionally, the total utilization of memory is very high, which can lead to inefficiencies. The total utilization of memory and the allocation of memory often conflict.

Therefore, there is a need in the art for a method and system to efficiently utilize and allocate memory among multiple processors.

SUMMARY OF THE DISCLOSURE

The present disclosure generally relates to a method and system for efficiently sharing limited memory among multiple processors. Each processor has a local linked list. The local linked list identifies the pages allocated to the specific processor as well as the number of free codewords for each allocated page. Additionally, the local linked list includes the location of the next free codeword(s) for each allocated page. When all codewords are available, the page is considered free and may be sent back to the page pool used by all of the processors. If there are a sufficient number of contiguous free codewords on an allocated page, then new codeword data may be stored in the page. If there is not a sufficient number of contiguous free codewords on any allocated page, then a new page is allocated to the processor from the page pool. Efficient allocation of memory resources is achieved because pages are not swapped back to the free pool unless no codewords remain allocated in the page, which reduces overhead for allocation and free pages; codewords within a page can be reused before the entire page is released, thus maintaining a higher overall utilization of buffer; and as codewords are freed, the pages are added to the codeword contiguous free count thus allowing for larger allocations to be made to increase overall buffer utilization.

Reference is made within the disclosure to a "storage device". It is to be understood that the "storage device" is not to be limited to any specific storage device such as an SSD, HDD or other memory device. Rather, it is to be understood that unless specifically stated, a "storage device" is to encompass the possibility of any generic storage device.

In one embodiment, a system comprises a host device; and a storage device coupled to the host device. The storage device comprises a plurality of processors. Each processor includes: means to create a local linked list; means to allocate a free page from a page pool; means to return a free page to the page pool; means to allocate and free codewords from the page; means to check the local linked list; means to change identification of a first free codeword in the local linked list; and means to change an identification number of a number of codewords free in the local linked list. The storage device also includes a memory device coupled to each processor of the plurality of processors.

In another embodiment, a method comprises: checking a local linked list on a first processor of a plurality of processors; determining that an allocated page on the local linked list has a number of contiguous codewords that is greater than or equal to a number of codewords to be allocated; allocating codewords from the allocated page; incrementing a number of a first codeword free for the allocated page in the local linked list; and decreasing a number of codewords free for the allocated page in the local linked list.

In another embodiment, a method comprises: freeing one or more codewords in an allocated page, wherein the allocated page is allocated to a first processor of a plurality of processors; incrementing a number of codewords free in the allocated page in a local linked list for the first processor; determining whether the allocated page has any codewords allocated; and returning the allocated page to a page pool, wherein the page pool is shared by the plurality of processors.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a method and system for efficiently sharing limited memory among multiple processors. Each processor has a local linked list. The local linked list identifies the pages allocated to the specific processor as well as the number of free codewords for each allocated page. Additionally, the local linked list includes the location of the next free codeword(s) for each allocated page. When all codewords are available, the page is considered free and may be sent back to the page pool used by all of the processors. If there are a sufficient number of contiguous free codewords on an allocated page, then new codeword data may be stored in the page. If there is not a sufficient number of contiguous free codewords on any allocated page, then a new page is allocated to the processor from the page pool. Efficient allocation of memory resources is achieved because pages are not swapped back to the free pool unless no codewords remain allocated in the page, which reduces overhead for allocation and free pages; codewords within a page can be reused before the entire page is released, thus maintaining a higher overall utilization of buffer; and as codewords are freed, the pages are added to the codeword contiguous free count thus allowing for larger allocations to be made to increase overall buffer utilization.

Figure 1:
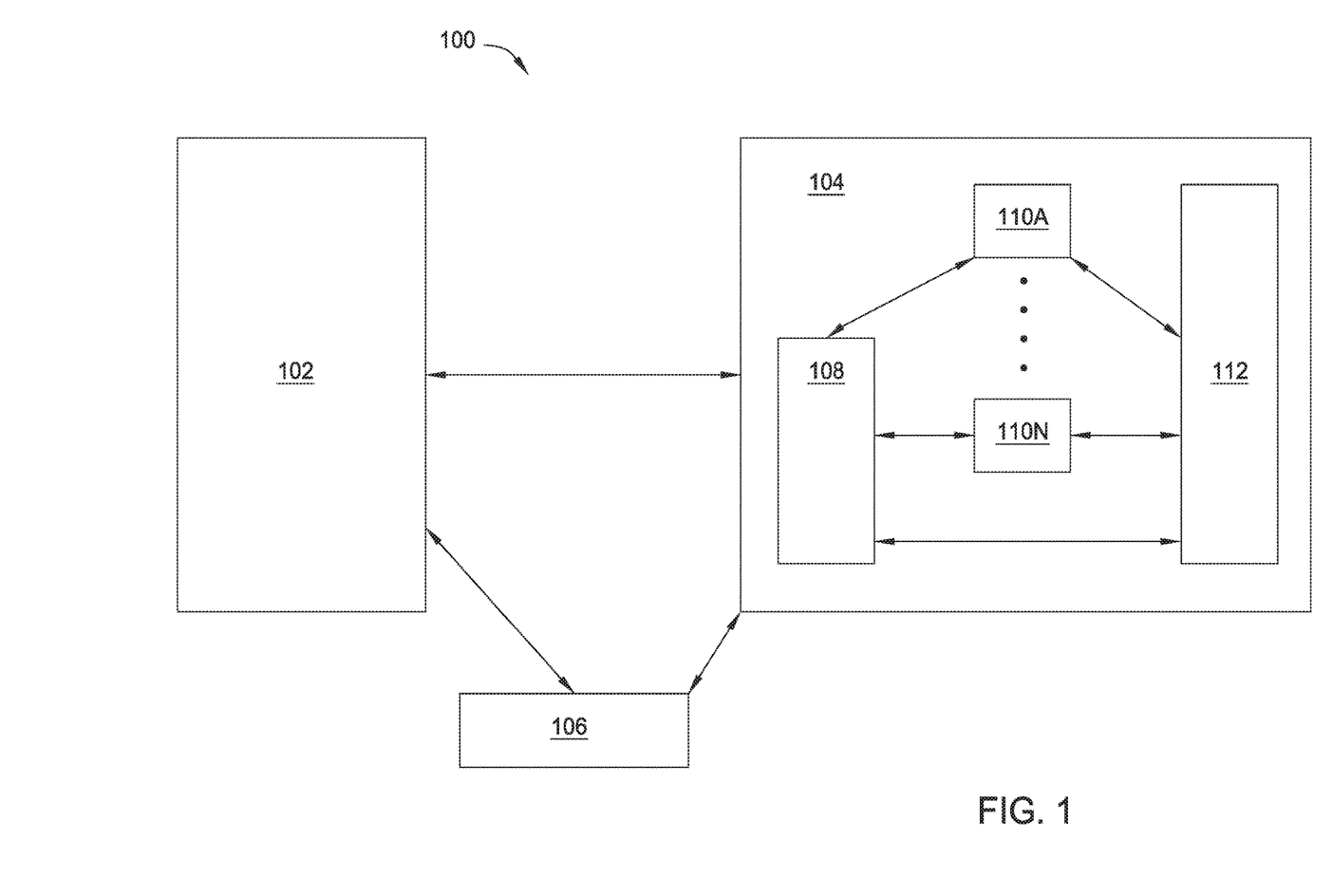
FIG. 1 is a schematic illustration of a system according to one embodiment.

FIG. 1 is a schematic illustration of a system 100 according to one embodiment. The system includes a host device 102 that interacts with a storage device 104. A controller 106 is coupled to both the host device 102 and the storage device 104. The storage device 104 stores data that may be needed by the host device 102 at various times. When the data is needed, the host device 102 contacts the storage device 104 to obtain the data. The controller 106 controls the communication between the storage device 104 and the host device 102.

The storage device 104 includes a controller 108 and multiple CPUs or processors 110A-110N. The storage device 104 also includes a memory device 112. The memory device 112 is coupled to all of the CPUs 110A-110N as well as the controller 108.

Figure 2A:
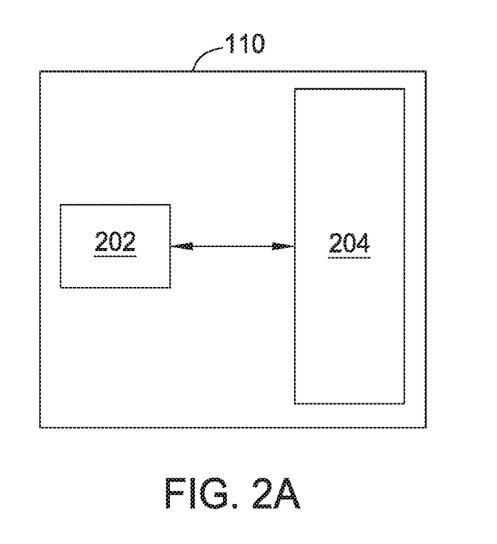
FIG. 2A is a schematic illustration of a processor of the system of FIG. 1.

FIG. 2A is a schematic illustration of a generic CPU or processor 110 of the system 100 of FIG. 1. In FIG. 2A, the CPU 110 is shown to have a controller 202 that interacts with both a cache storage 204 and the memory device 112. As will be discussed below, the memory device 112 includes a plurality of pages that can be allocated to the plurality of processors 110A-110N. Each processor 110A-110N has a local linked list that includes identification of one or more allocated pages, a listing of the first codeword free for each allocated page in the local linked list, and a listing of the total number of codewords free for each allocated page in the local linked list.

The controllers 106, 202 are digital circuits that manage the flow of data going to and from the storage device 104 (in the case of controller 106) and to and from an individual CPU 110A-110N (in the case of controller 202). The controllers 106, 202 can be separate chips or integrated into other chips, such as being placed on the same die or as an integral part of a CPU (as in the case of controller 202). Controllers 106, 202 may be referred to as integrated memory controllers (IMC), a memory chip controller (MCC) or a memory controller unit (MCU). The controllers 202 function to create a local linked list; to allocate codewords among allocated pages; to check the local linked list; to change identification of a first free codeword in the local linked list; and to change an identification number of a number of codewords free in the local linked list.

Figure 2B:
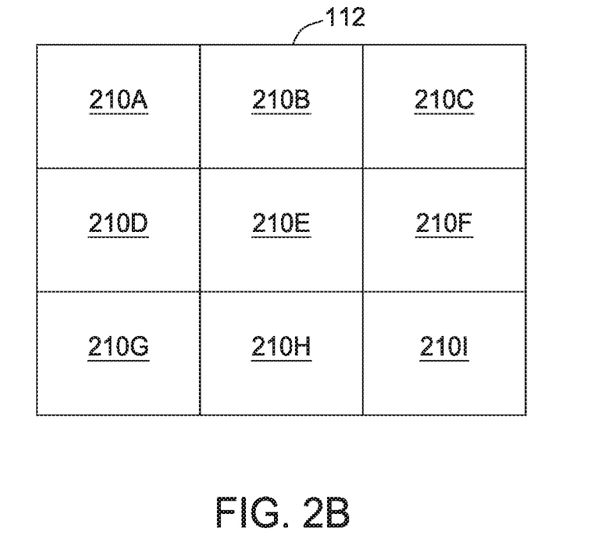
FIG. 2B is a schematic illustration of a memory device having multiple pages.

FIG. 2B is a schematic illustration of a memory device 112 having multiple pages 210A-210I. It is to be understood that while nine separate pages have been shown, the memory device 112 may have more or less pages. Nine pages 210A-210I are used for exemplification purposes only and is not to be limiting.

Figure 3:
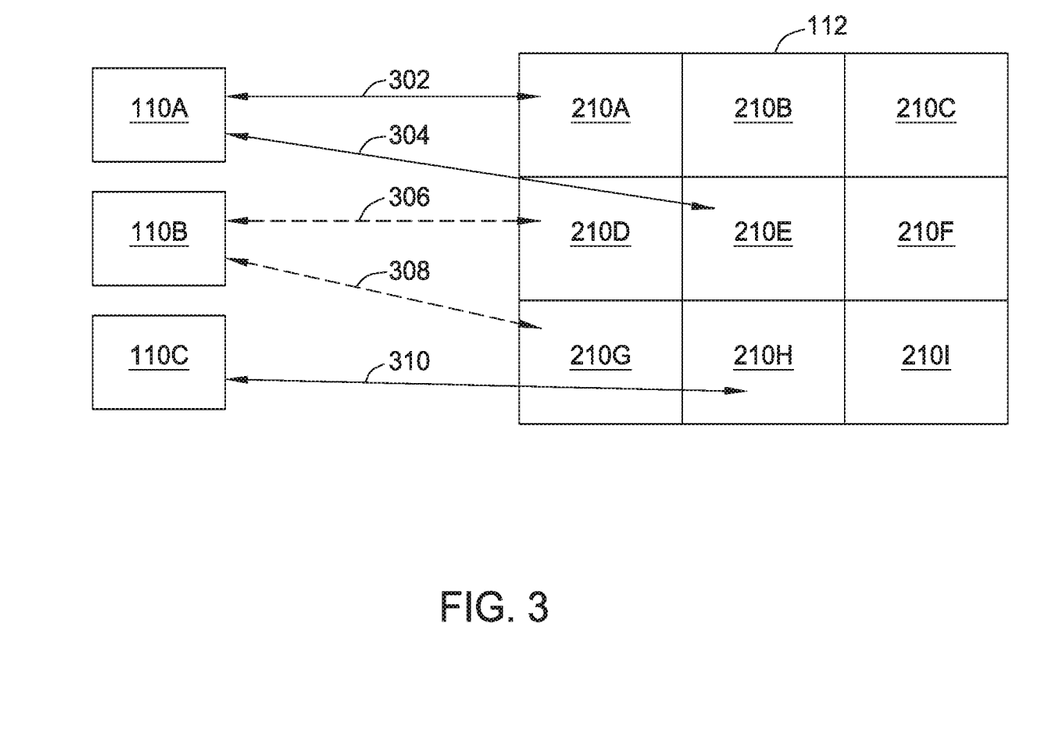
FIG. 3 is schematic illustration of multiple processors accessing a common memory device according to one embodiment.

FIG. 3 is schematic illustration of multiple processors 110A-110C accessing a common memory device 112 according to one embodiment. As shown in FIG. 3, each processor 110A-110C has access to all of the multiple pages 210A-210I in the entire memory device 112. However, while each processor 110A-110C has access to all of the pages 210A-210I, certain pages 210A-210I have been allocated to certain processors 110A-110C while certain pages 210A-210I are not currently needed by any processor 110A-110C and thus are still in the page pool of unallocated or available pages 210A-210I. In particular, processor 110A currently has pages 210A, 210E allocated thereto as shown by lines 302, 304; processor 110B has pages 210D, 210G allocated thereto as shown by lines 306, 308; and processor 110C has page 210H allocated thereto as shown by line 310.

As noted above, there is a need in the art for a method and system to efficiently allocate memory among multiple processors. To solve the need, some parameters need to be implemented. Codeword allocations for a specific read request should all be contiguous. A single page should be used for as many codeword allocations as possible. A new page should not be allocated from the memory or page pool until no pages already allocated have enough contiguous codewords available therein to meet the new codeword allocation request. Codewords for a specific read request cannot span multiple memory pages since pages allocated by a processor are not guaranteed to be contiguous and so those pages can be freed up as quickly as possible for other uses once the pages are unused.

In order to ensure efficient allocation of memory among the multiple processors, a local linked list is created on each processor. Each element in the list contains the page unique ID (PageUID); unique ID of the first codeword free in the page (FirstCwFree); and the number of contiguous codewords free from the first (NumCwFree), where numCwFree is less than or equal to the number of codewords in a page (NumCwPerPage).

When a processor needs to allocate codewords (NumCwToAllocate), the processor first checks the local, associated linked list on the processor to look for a node where NumCwFree is greater than or equal to NumCwToAllocate. If a node is found, the processor increments FirstCwFree and decrements NumCwFree by NumCwToAllocate. The processor then completes the assigned task.

If a node is not found, then the processor allocates a new page from the global page pool. The processor then adds a new node to the processor's local linked list where FirstCwFree is set to NumCwToAllocate and NumCwFree is set to NumCwPerPage-NumCwToAllocate. The processor then completes the assigned task.

When a processor is done with the codewords, the processor first checks the processor's local linked list to look for a node with the same PageUID as that of the codewords to be freed and a range of free code words immediately preceding or following the range to be freed. If a matching node is not found, the processor adds a new node to the processor's local linked list for the codeword range to be freed.

If a matching node is found, then the processor increments NumCwFree by NumCwToAllocate and, if the new range to free precedes the existing free range, also decrements FirstCwFree by NumCwToAllocate. If NumCwFree equals NumCwPerPage, the node is removed from the local linked list of the processor and the entire page is returned to the global pool.

Figure 4A:
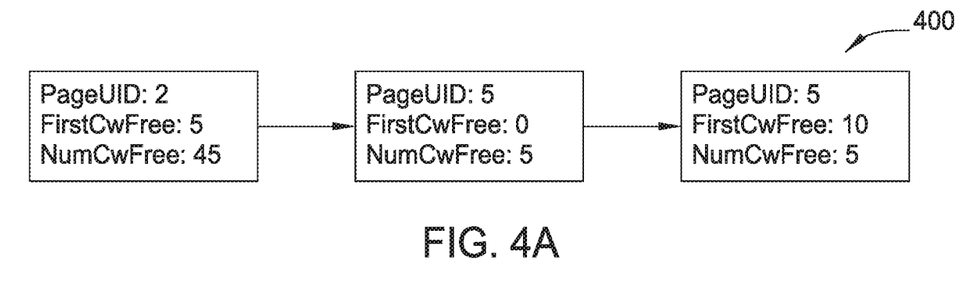
FIGS. 4A-4E are schematic illustrations of a local linked list for a processor according to one embodiment.

FIGS. 4A-4E are schematic illustrations of a linked list 400 for a processor according to one embodiment. FIG. 4A represents some point in time where two pages have been allocated to a processor. As shown in FIG. 4A, the processor has two pages allocated thereto, PageUID 2 and PageUID 5. For PageUID 2, the FirstCwFree is at 5 with the NumCwFree equal to 45. PageUID 5, on the other hand, has the FirstCwFree at 0 with NumCwFree equal to 5. Additionally, PageUID 5 has additionally codewords not yet allocated starting at 10 with NumCwFree equal to 5. Thus, on PageUID 2, the codewords 0-4 are allocated and codewords 5-49 are available. For PageUID 5, codewords 0-4 and 10-14 are available while codewords 5-9 and all codewords from 15 to the last codeword are allocated.

Figure 4B:
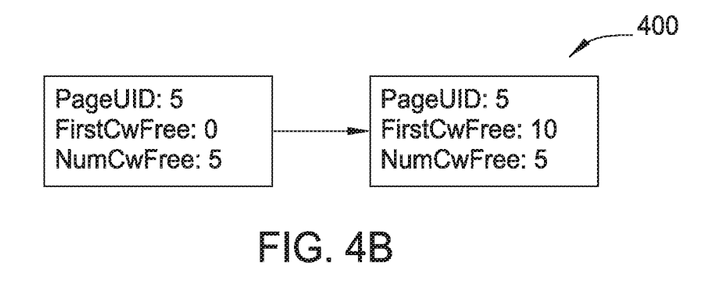

Moving now to FIG. 4B, the five used codewords from PageUID 2 (i.e., codewords 0-4) have been freed. Therefore, for PageUID 2, all codewords have been freed and the entire PageUID 2 is not in use. Thus, PageUID 2 can be returned to the page pool for another processor to allocate. Therefore, in FIG. 4B, PageUID 2 is no longer shown as PageUID 2 has been returned to the pool.

Figure 4C:
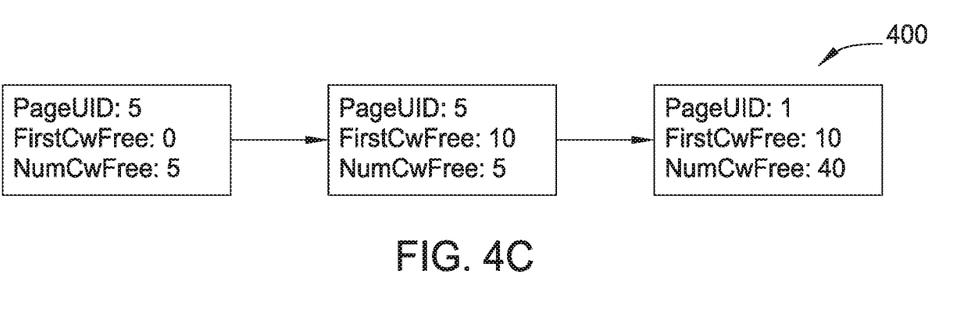

Moving now to FIG. 4C, 10 codewords now need allocated for the processor. PageUID 5 still has FirstCwFree at 0 with NumCwFree equal to 5, and PageUID 5 has additional codewords free with the next codeword free at 10 and NumCwFree equal to 5. Therefore, PageUID 5 does not have 10 or more sequential or continuous codewords free and thus, PageUID 5 is not sufficient for allocating the 10 codewords. Therefore, a new page, PageUID 1, needs to be allocated from the pool to the processor. PageUID 1 has 50 codewords upon being allocated to the processor, none of which are in use. Thus, there are 10 continuous codewords available in PageUID 1, and PageUID 1 is used for the 10 codewords. Once the 10 codewords are allocated from PageUID 1, PageUID 1 has a FirstCwFree at 10 with NumCwFree equal to 40.

Figure 4D:
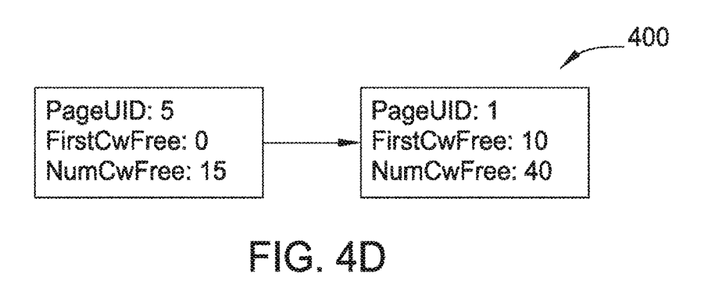

Moving now to FIG. 4D, five codewords are freed from codewords 5-9 on PageUID 5. Thus, PageUID 5 now has the FirstCwFree at 0 as before, but the NumCwFree is 15. Therefore, codewords 0-14 are now free and, assuming that there are more than 15 codewords in PageUID 5, the remaining codewords are allocated. If no codewords in PageUID 5 are allocated, then PageUID 5 may be returned to the pool.

Figure 4E:
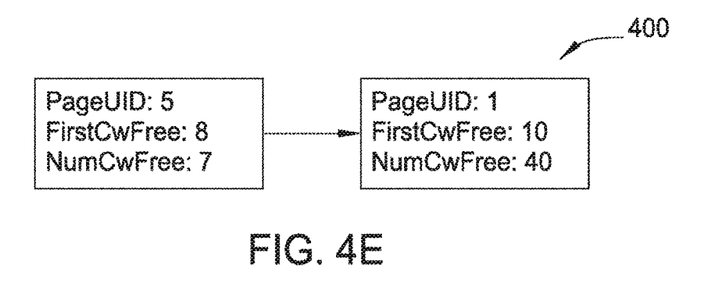

Moving now to FIG. 4E, 8 codewords need to be allocated. PageUID 5 has 15 codewords free starting at codeword 0. PageUID 1 has 40 codewords free starting at codeword 10. Thus, both PageUID 1 and PageUID 5 have at least 8 continuous codewords free. If PageUID 5 is utilized for the 8 codewords, as shown in FIG. 4E, then after the 8 codewords are allocated to PageUID 5, the FirstCwFree is 8 for PageUID 5 and the NumCwFree is 7 for PageUID 5. The 7 remaining codewords in PageUID 5 and the 40 remaining codewords in PageUID 1 may be used at a later time.

Figure 5:
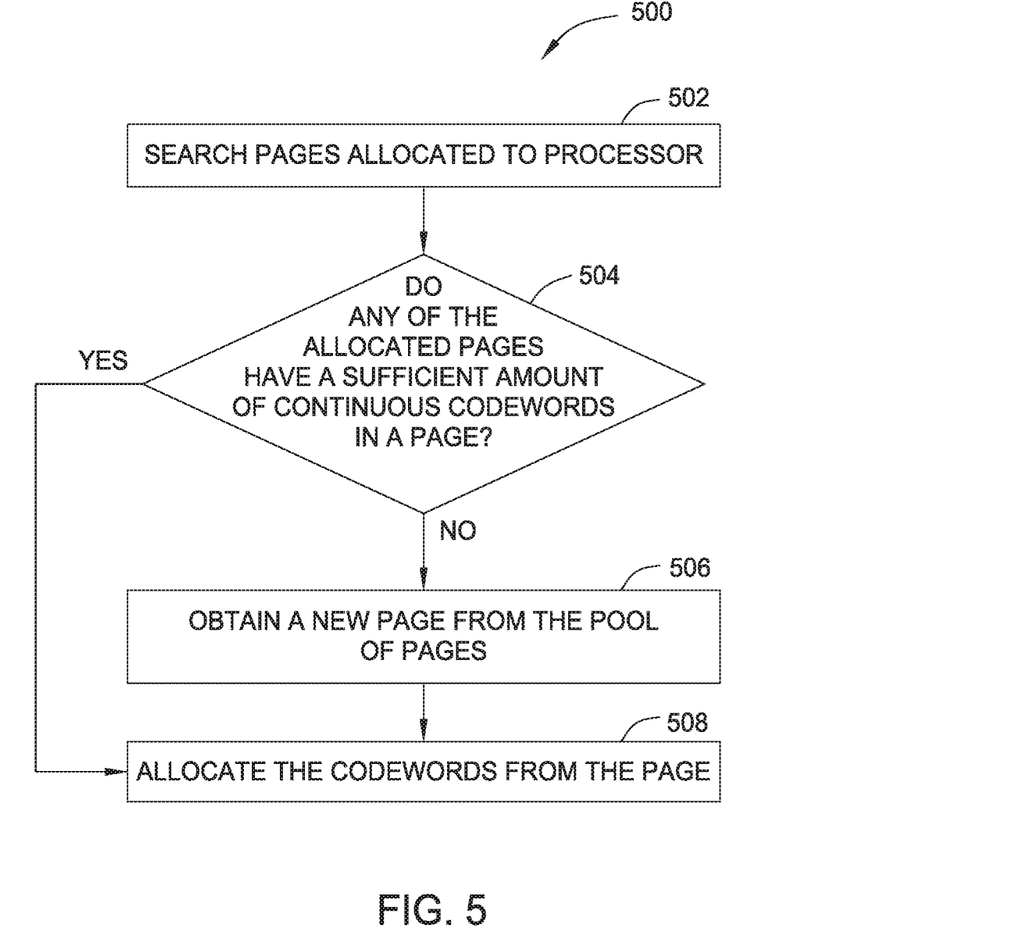
FIG. 5 is a flow chart illustrating an embodiment of the disclosure.

FIG. 5 is a flow chart 500 illustrating an embodiment of the disclosure. The process starts with a processor having a plurality of codewords to allocate. The processor searches the pages allocated thereto in block 502. A determination is made in block 504 as to whether there are a sufficient number of continuous codewords available in the allocated pages for allocating the codewords from the page. If there is not a sufficient number of continuous codewords available, then a new page is allocated from the pool of pages in block 506 and the codewords are then allocated from the new page in block 508. If there is a sufficient number of continuous codewords in block 504, then the codewords are allocated from a page that has the sufficient number of continuous codewords in block 508.

Figure 6:
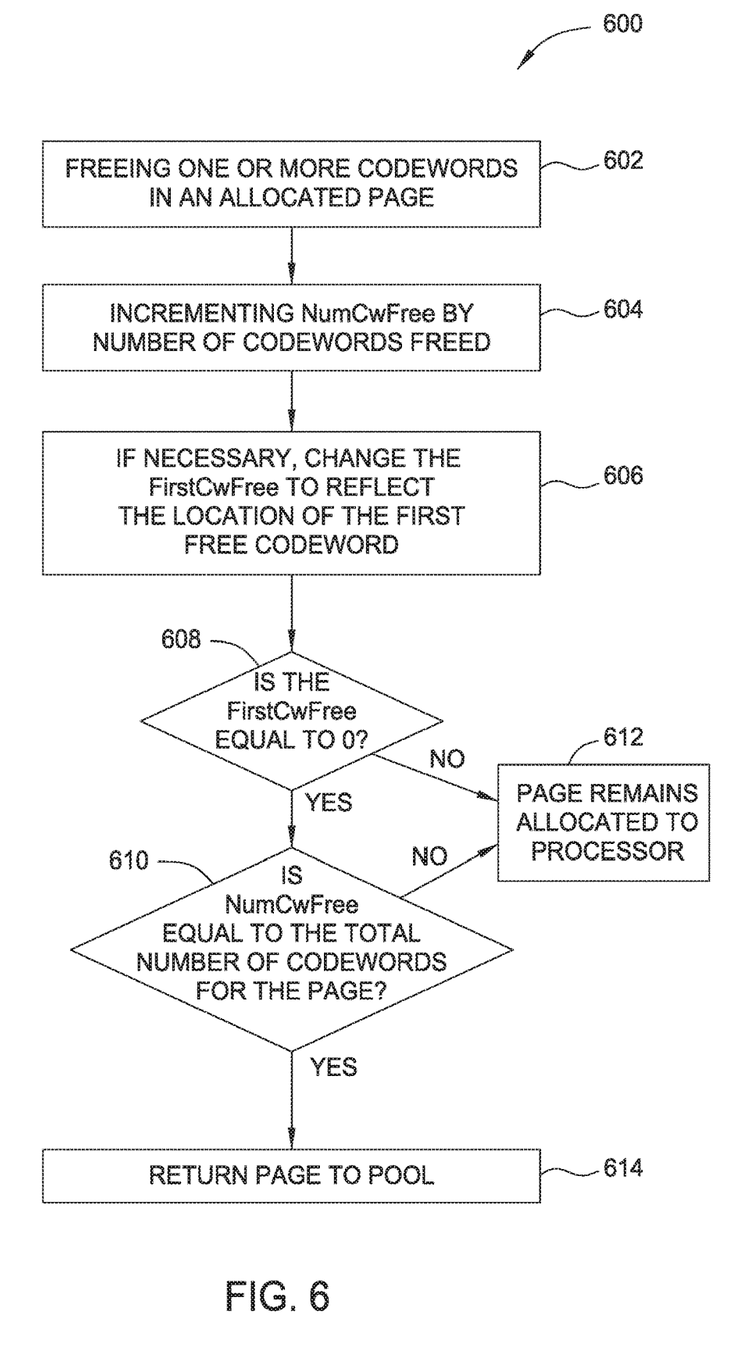
FIG. 6 is a flow chart illustrating another embodiment of the disclosure.

FIG. 6 is a flow chart 600 illustrating another embodiment of the disclosure. The process starts with a processor freeing up one or more codewords in a page that has been allocated to the processor in block 602. The processor then increments the NumCwFree in the local list by an amount equal to the number of codewords freed in block 604. Depending upon the first contiguous codeword that has been freed, the processor may need to change the FirstCwFree to reflect the location of the first free codeword in block 606. If the FirstCwFree is now 0 in block 608 and the NumCwFree is equal to the total number of codewords on the page in block 610, then the page is returned to the pool in block 614. If the FirstCwFree is not 0 in block 606 or the NumCwFree is less than the total number of codewords on the page, then the page remains allocated to the processor in block 612.

In operation, the method involves checking a local linked list on a first processor of a plurality of processors; determining that an allocated page on the local linked list has a number of contiguous codewords that is greater than or equal to a number of codewords to be allocated; allocating codewords from the allocated page; incrementing a number of a first codeword free for the allocated page in the local linked list; and decreasing a number of codewords free for the allocated page in the local linked list. The method may additionally include: checking the local linked list on the first processor; determining that allocated pages do not have sufficient contiguous codewords available; and obtaining a new page from a page pool shared by the plurality of processors. The method may further include allocating codewords from the new page and updating the local linked list. The method may further comprise freeing a plurality of codewords from a second page allocated to the first processor; determining that all of the codewords for the second page are free; and returning the second page to a page pool. The method may further comprise checking a local linked list on a second processor of a plurality of processors; determining that an allocated page on the local linked list of the second processor has a number of contiguous codewords that is greater than or equal to a number of codewords to be allocated; allocating codewords from the allocated page; incrementing a number of a first codeword free for the allocated page in the local linked list; and decreasing a number of codewords free for the allocated page in the local linked list. Additionally, the method may include freeing a plurality of codewords from a second page allocated to the second processor; determining that all of the codewords for the second page are free; and returning the second page to a page pool. Finally, the method may include checking the local linked list on the second processor; determining that allocated pages do not have sufficient contiguous codewords available; and obtaining a new page from a page pool shared by the plurality of processors.

Also, in operation, the method may comprise checking a local linked list on a first processor of a plurality of processors, wherein checking comprises: looking for an allocated page of the first processor with a same PageUID as one or more codewords to be freed; and looking for a range of free codewords immediately preceding or following the one or more codewords to be freed; determining if there is a page to be freed; and returning the page to the page pool if the page is determined to have no codewords allocated therefrom.

By allocating codewords in a continuous manner in allocated pages, multiple processors can efficiently share limited memory. The memory allocation is contiguous with no SGLs and a single page is used for as many memory allocations as possible to maximize the usage of an allocated page. No single memory allocation spans multiple pages. Furthermore, as codewords are freed, a determination is made as to whether the allocated page still has any codewords allocated. If no codewords are allocated in an allocated page, then the page is returned to the page pool and is available for allocation to any other processor. By doing the above, memory allocate is fast and efficient.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
checking a local linked list on a first processor of a plurality of processors;
determining that any allocated page of a plurality of allocated pages on the local linked list has a number of contiguous codewords that is greater than or equal to a number of codewords to be allocated;
allocating codewords from an allocated page of the plurality of allocated pages having the number of contiguous codewords greater than or equal to the number of codewords to be allocated;
incrementing a number of a first codeword free for the allocated page in the local linked list; and
decreasing a number of codewords free for the allocated page in the local linked list, and wherein each page of the local linked list is searched for the number of contiguous codewords that is greater than or equal to a number of codewords to be allocated.

2. The method of claim 1, further comprising:
checking the local linked list on the first processor;
determining that any allocated page from the plurality of allocated pages does not have sufficient contiguous codewords available; and
obtaining a new page from a page pool shared by the plurality of processors.

3. The method of claim 2, further comprising allocating codewords from the new page.

4. The method of claim 3, further comprising updating the local linked list.

5. The method of claim 4, further comprising:
freeing a plurality of codewords from a second page allocated to the first processor;
determining that all of the codewords for the second page are free; and
returning the second page to a page pool.

6. The method of claim 1, further comprising:
checking a second local linked list on a second processor of a plurality of processors;
determining that any allocated page of a second plurality of allocated pages on the second local linked list of the second processor has a number of contiguous codewords that is greater than or equal to a number of codewords to be allocated;
allocating codewords from an allocated page of the second plurality of allocated pages having the number of contiguous codewords greater than or equal to the number of codewords to be allocated;
incrementing a number of a first codeword free for the allocated page of the second plurality of allocated pages in the second local linked list; and
decreasing a number of codewords free for the allocated page of the second plurality of allocated pages in the second local linked list.

7. The method of claim 6, further comprising:
freeing a plurality of codewords from a second page allocated to the second processor;
determining that all of the codewords for the second page are free; and
returning the second page to a page pool.

8. The method of claim 7, further comprising:
checking the local linked list on the second processor;
determining that any allocated page from the second plurality of allocated pages does not have sufficient contiguous codewords available; and
obtaining a new page from a page pool shared by the plurality of processors.

9. A method, comprising:
searching all allocated pages of a local linked list for at least one page with an allocation of at least one free codeword;
freeing one or more codewords in any one of the plurality of allocated pages, wherein an allocated page of the plurality of allocated pages having one or more codewords freed is allocated to a first processor of a plurality of processors;
incrementing a number of codewords free in the allocated page in the local linked list for the first processor;
determining whether the allocated page has any codewords allocated; and returning the allocated page to a page pool, wherein the page pool is shared by the plurality of processors.

10. The method of claim 9, wherein determining whether the allocated page has any codewords allocated includes determining that the first codeword free in the allocated page is equal to 0.

11. The method of claim 10, wherein determining whether the allocated page has any codewords allocated includes determining that the number of codewords free in the allocated page is equal to the total number of codewords in the allocated page.

12. The method of claim 9, wherein determining whether the allocated page has any codewords allocated includes determining that the number of codewords free in the allocated page is equal to the total number of codewords in the allocated page.

* * * * *